Sept. 30, 1969　　　M. W. GAUMER　　　3,469,438
AUTOMATICALLY CONTROLLED MULTIPLE SAMPLING MEASUREMENT SYSTEM
Filed April 12, 1967　　　　　　　　　　　　　4 Sheets-Sheet 1

INVENTOR
Marvin W. Gaumer
BY Daniel R. Levinson
ATTORNEY

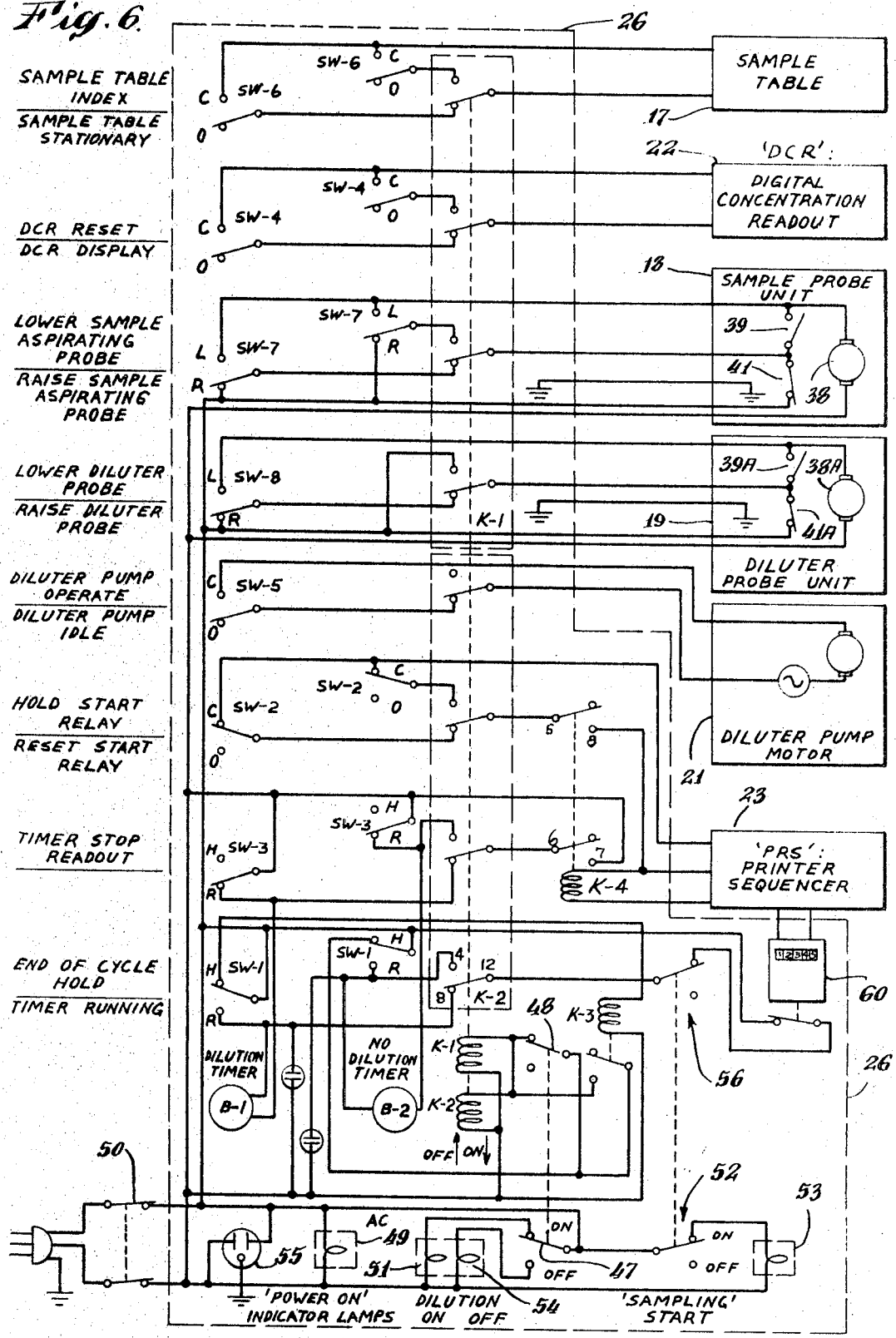

United States Patent Office

3,469,438
Patented Sept. 30, 1969

3,469,438
AUTOMATICALLY CONTROLLED MULTIPLE SAMPLING MEASUREMENT SYSTEM
Marvin W. Gaumer, Ridgefield, Conn., assignor to The Perkin-Elmer Corporation, Norwalk, Conn., a corporation of New York
Filed Apr. 12, 1967, Ser. No. 630,394
Int. Cl. G01n 11/00
U.S. Cl. 73—53                11 Claims

ABSTRACT OF THE DISCLOSURE

Fluid sample testing apparatus that measures a predetermined characteristic of a fluid sample and produces an output signal which is a function of the measured characteristic. The sample is tested until a predetermined period of output signal initiates the indexing of the sample handling table and the next sample is withdrawn and tested.

Background of the invention: Atomic absorption spectrophotometry

Serious difficulties have been encountered in measuring the concentrations of individual trace elements present in test samples by conventional emission spectroscopy, because the values determined are often affected by chemical interferences and by spectral interferences. Furthermore, in emission spectroscopy, excitation of the atoms of the selected trace element must be achieved in order to produce emission of radiation suitable for observation. Achieving such excitation is often difficult; sodium, for instance, is one of the elements whose concentrations are most favorably determined by flame emission, and only about 1.5% of the sodium atoms present are normally excited at obtainable flame temperatures in emission spectroscopy.

For these reasons, atomic absorption spectrophotometry has come into wide and increasing use. Spectral interferences are substantially eliminated by the use, as emission radiation sources, of lamps and monochromators together producing radiation substantially confined within the spectral wavelength region of interest, which is determined by selection of the most easily observed absorption line in the absorption spectrum of the trace element whose concentration is to be determined. Precise selection of the emission radiation spectrum of the source is achieved by the use of a grating monochromator, employed in cooperation with such radiation sources as hollow cathode lamps enclosed in an envelope filled with argon or neon at a low pressure, with the hollow cathode being filled with the particular trace substance whose concentration is being determined.

Fluid samples are generally aspirated directly with air into the flame of an air-acetylene burner. Excellent distribution of the atomized sample in the flame is generally secured when the sample is diluted with water, and in many case improved distribution of the sample element in the flame is achieved through the use of organic solvents such as alcohol or methyl isobutyl ketone, although such organic solvents introduce materials handling problems in some cases.

In atomic absorption spectrophotometry, the trace element to be measured need not be excited. It is merely dissociated from its chemical bonds and placed in an unexcited, unionized "ground" state in which it is capable of absorbing radiation at discrete lines of narrow bandwidth, the same lines which would be emitted if the element were excited.

Using atomic absorption spectrophotometry, at least 65 of the chemical elements can now be determined in concentrations on the order of one part per million or less, as indicated in Table I, by the use of the Perkin-Elmer Corporation's Model 303 Atomic Absorption Spectrophotometer.

For a full discussion of atomic absorption spectrophotometry, the radiation emission sources used, the fuels, burners and oxidants employed, the sample aspirating devices, the monochromators, the preferred dual beam optical systems and the high degrees of precision achieved in the measurement of concentration of specific trace elements through the use of atomic absorption, see Herbert L. Kahn, Instrumentation for Atomic Absorption, 43 Journal of Chemical Education, No. 1, January 1966 and No. 2, February 1966.

Summary of the invention

Despite the accurate and precise measurements made possible by atomic absorption, a significant problem encountered with the use of such systems has been the complications introduced by the handling of large numbers of samples and accurately tabulating their measured concentrations.

TABLE I

| Detection limits below 0.1 p.p.m. in water solution (303)[1] | | | | | | | | | | Detection limits between 0.1 and 1 p.p.m. in water solution (303) | | | | | | | Detection limits between 1 and 30 p.p.m. in water solution (303) | | | | |
|---|---|---|---|---|---|---|---|---|---|---|---|---|---|---|---|---|---|---|---|---|---|
| Ag | Ba | Ca | Cr | Ga | Li | Mo | Pb | Sr | | As | Eu | Pd | Sb | Si | Th | Y | B | Hf | Nd | Sm | U |
| Al | Be | Cd | Cu | In | Mg | Na | Rb | Yb | | Dy | Hg | Pt | Sc | Sn | Tm | | Gd | Ir | Pr | Ta | W |
| Au | Bi | Co | Fe | K  | Mn | Ni | Rh | Zn | | Er | Ho | Ru | Se | Ti | V  | | Ge | Nb | Re | Tb | Zr |

[1] Many of these detection limits are very far below 0.1 p.p.m. The detection limit for Mg, for example, is about 0.0003 p.p.m. Organic solvents improve detection limits up to three times.

With the automated atomic absorption spectrophotometry systems of the present invention, large numbers of fluid samples may be tested while they are stored and indexed in a suitable sample indexing table of the kind shown in Forsstrom United States Patent 3,221,781. In this indexing table, each sample is successively indexed to bring it to an aspirating station where a portion of the fluid sample is withdrawn by compressed air aspiration, delivering the sample in an air stream directly to the burner flame of an atomic absorption spectrophotometer. The spectrophotometer determines the degree of absorption of the particular spectral wavelength of interest, corresponding to the principal absorption line of the chemical element whose concentration is being measured, and the resulting data is preferably converted and recorded by such means as a digital concentration readout feeding information to a data recording device, a tape punching device or a paper printer.

The actuation of the indexing sample table, the aspirator device and associated diluter devices, and the cooperating actuation of the digital concentration readout device and the data recording device require automatic interaction and cooperation among various different events, some of which must be delayed until others are initiated.

Accordingly, a principal object of the present invention is to provide automated concentration measurement and recording systems, such as those employed in atomic absorption spectrophotometry, incorporating timing controller systems governing the operation of the various subassemblies of the systems.

Another object of the invention is to provide such timing controller systems assuring indexing delivery of successive fluid samples to an aspirating station.

A further object is to provide such timing controller systems providing automatic dilution of samples with a preselected diluent in predetermined dilution ratios.

Another object of the invention is to provide such timing controller systems affording automatic initiation of digital concentration readout data after concentration measurement of each sample has begun.

A further object is to provide such timing controller systems affording automatic interruption of the operating cycle after digital concentration data readout has begun, to assure recording and presentation of the data by tape punching or paper tape imprinting data recording devices.

Another object of the invention is to provide such timing controller systems affording the operator a choice between the sample dilution mode of operation and a second, non-dilution operating mode in which raw samples are delivered directly to the aspirator station, with means for assuring that a change between these two operating modes made during an operating cycle will not interrupt or delay the completion of that operating cycle.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings.

The drawings

FIGURE 1 is a schematic perspective view showing a Perkin-Elmer automated atomic absorption analyzer system, incorporating a timing controller system of the present invention employed with a Perkin-Elmer Model 303 Atomic Absorption Spectrophotometer manufactured and sold by the Perkin-Elmer Corporation, Norwalk, Conn. This spectrophotometer is illustrated measuring diluted samples delivered by an indexing sample table placed directly before the spectrophotometer, whose measurements are supplied to a Perkin-Elmer "DCR" digital concentration readout system connected to a Perkin-Elmer "PRS" printer sequencer device, with the operation of all of the foregoing units being governed by a Perkin-Elmer Model 4A timing controller system, with the readout, the printer sequencer and the controller system being arrayed one above the other at the left-hand side of the figure;

FIGURE 6 is a schematic circuit diagram of the timing controller system shown in the previous figures which produces the successive events illustrated in the diagram of FIGURE 5.

Similar reference characters refer to similar parts throughout the several views of the drawings.

Description of the preferred embodiment

Figure 1:
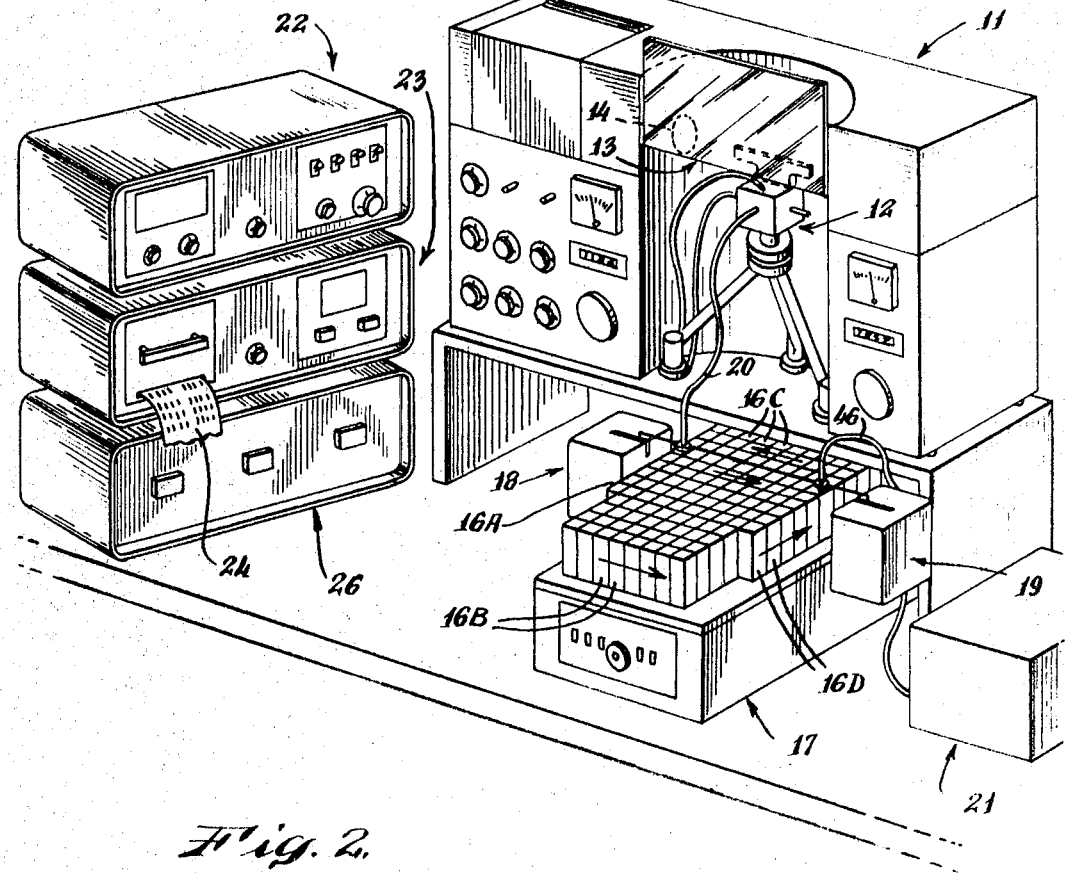

The various sub-units of an atomic absorption analyzer system for measurement and recording of data showing the concentration in parts per million of trace elements in a large number of individual liquid samples is shown in FIGURE 1. In the combined system there illustrated, a Perkin-Elmer Model 303 atomic absorption spectrophotometer 11 is shown at the upper right-hand portion of the figure. An acetylene burner 12 is positioned in a recess 13 in the spectrophotometer 11, and is connected by suitable flexible tubing to a storage tank of compressed combustible gas, such as acetylene or hydrogen (not shown), and also connected to a source of oxidant such as compressed air, which may be an air-compressor or a compressed air storage tank (not shown).

The burner 12 presents its open flame at the upper end of the recess 13 formed in the front face of the spectrophotometer unit 11 between a pair of apertures 14 (FIGURES 1, 3) formed in the facing side walls of recess 13, and the burner flame is thus positioned directly in the path of analyzing radiation passing from a suitable hollow cathode lamp and monochromator radiation source through one aperture 14 across recess 13 to and through the other aperture 14 to suitable radiation detector devices.

A large number of liquid samples, from 50 to 100 or more, for example, are loaded in vials or test tubes in movable box-shaped holders or compartmented trays 16 mounted on a sample indexing table 17. The trays 16 are adapted to be moved or indexed by table 17 around a closed path, successively presenting each compartment of each tray for individual treatment at one or more treatment stations. The table 17 positioned in front of bumper 12, as shown in FIGURES 1 and 3, is a suitable sample indexing table like that shown in Forsstrom Patent 3,221,-781. Positioned at two treatment stations on opposite sides of sample table 17 are two generally similar "dippers" or aspirating probes, each located at a treatment station and adapted to be lowered into the individual vials or containers in the compartments of the trays on sample table 17 as they are successively indexed into position at these treatment stations. After treatment, the probes are then raised from the vials to permit the next indexing step to move the next vial-compartment into position at each treatment station. These "dippers" are shown as aspirator probe 18 and diluter probe 19 in FIGURES 1–4. The diluter probe 19 is operatively connected to a diluter device 21, while the aspirator probe 18 is operatively connected to supply sample fluid, from the containers in the compartments of trays 16 as they are successively indexed into position before the aspirator probe 18, directly into the flame of the burner 12. The sample fluid is drawn through a suitable short length of flexible tubing 20 connecting aspirator probe 18 with burner 12 by the continuous aspiration provided by all or a part of the compressed air which is continuously supplied to the burner.

Figure 2:
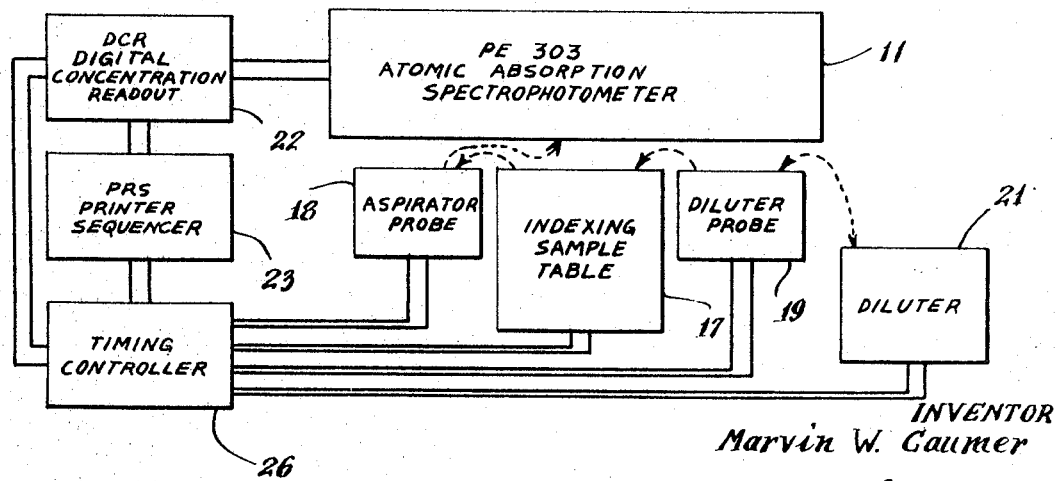
FIGURE 2 is a schematic block diagram of the operating units combined in the Perkin-Elmer automated atomic absorption analyzer system illustrated in FIGURE 1.
Figure 3:
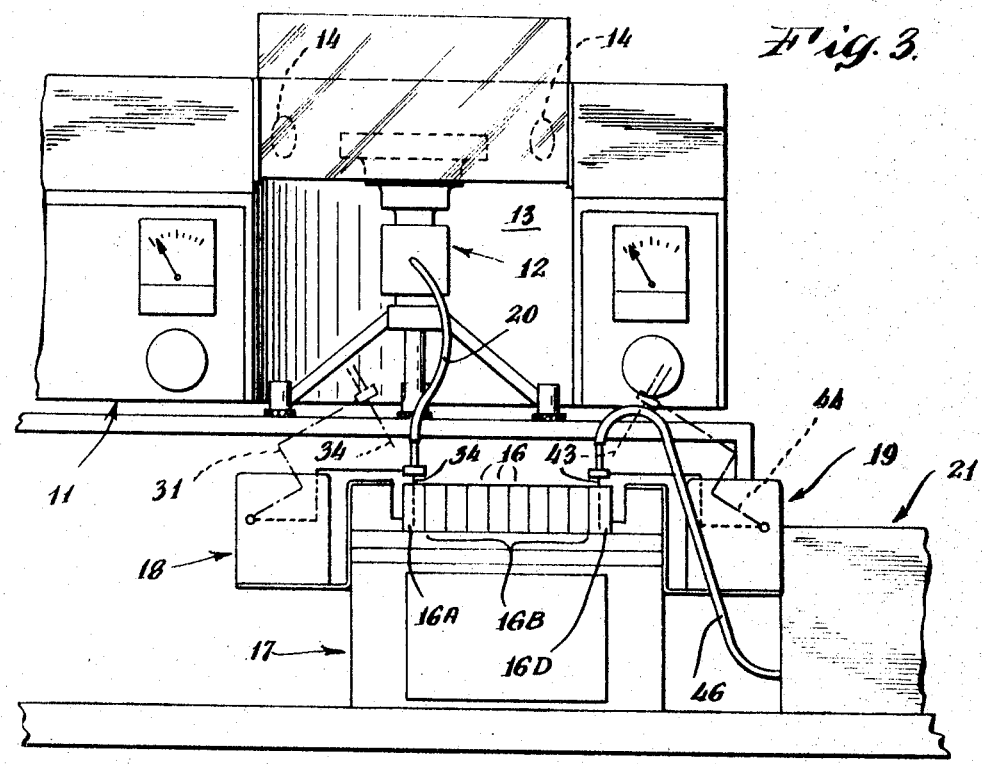
FIGURE 3 is a fragmentary enlarged front elevation view of the sample indexing table, diluter and aspirator probes and an acetylene burner unit of the spectrophotometer, all as shown in FIGURE 1.

The absorbance or degree of absorption of the radiation wavelength of interest as it passes through the flame of burner 12 between the apertures 14 is measured by comparison with a reference beam, producing an output signal from unit 11 which is delivered to an analog-digital converter such as the Perkin-Elmer Model "DCR" digital concentration readout unit 22, whose digital output is delivered in turn to a data recording device such as the Perkin-Elmer Model "PRS" paper tape printer sequencer unit 23 shown in FIGURES 1 and 2, where the data are recorded by being punched into paper tape or by being imprinted on a paper strip such as the tape 24 shown in FIGURE 1.

Figure 5:
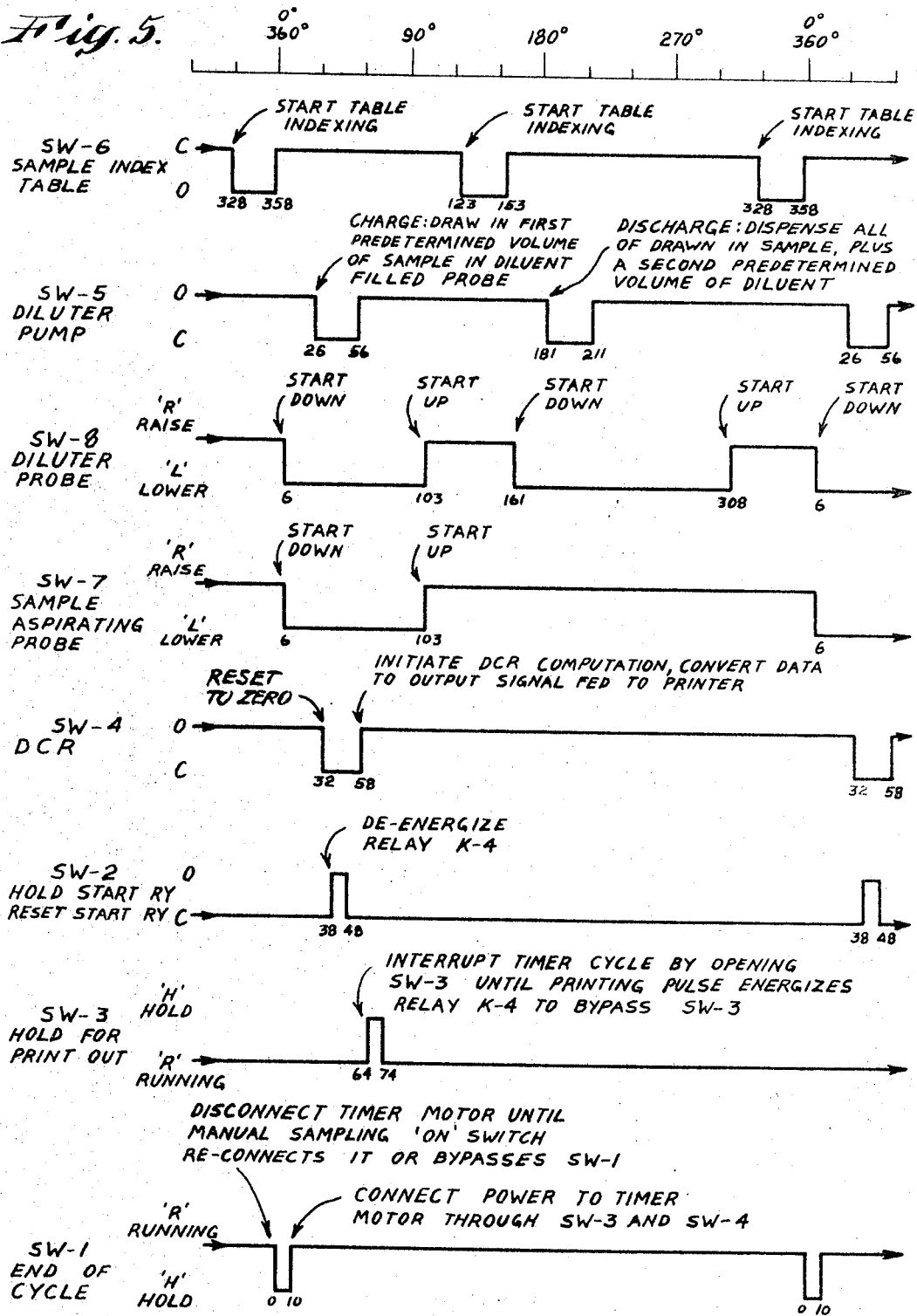
FIGURE 5 is a timing diagram showing the cooperating events produced by a timing controller of the present invention in the spectrophotometry system shown in the previous figures.

The timing controller unit 26 shown beneath the converter 22 and data recorder 23 in FIGURES 1 and 2 is electrically connected to these units as well as to sample table 17, probes 18 and 19 and diluter 21, providing the desired cooperating sequence of events by actuating each of these devices in turn. The preferred sequence of these events and the switching circuitry employed in the timer system of controller 26 are shown in FIGURES 5 and 6.

The atomic absorption analyzers which are commercially available are listed at the end of the Herbert L. Kahn article cited above, where their operation and instrumentation is fully described. The other sub-units shown in FIGURES 1 and 2 will be described in detail below.

Sample table 17

As indicated in the Forsstrom patent, the sample table provides an actuating support for the plurality of compartmented trays 16. As shown in FIGURE 1, the elongated trays 16 in this embodiment are arrayed in two block-shaped columns, a rear column 16C of advancing trays, intermittently advanced from the right toward the left at the rear side of table 17, and a front column of returning trays 16B moved correspondingly at intervals from the left toward the right across the front of table 17. During the intervals between the intermittent advances of the two columns 16B and 16C, a compartmented tray 16A is moved forward in a series of indexed steps, successively bringing each of its compartments containing vials of sample fluid in turn into alignment directly beneath the quill or capillary tube 34 (FIGURE 4) of an aspirating probe lowered therein and then raised therefrom by the aspirator probe unit 18 at its sampling station on the left-hand side of table 17. With each indexed step, the sample tray 16A is successively and intermittently moved from the rear toward the front of table 17, transferring it from the advancing column of trays 16C to the returning column of trays 16B. The front tray 16D at the head of returning column 16B is correspondingly moved in successive steps across the right-hand side of the table 17 from the front of returning column 16B to the end of advancing column of trays 16C at the rear of table 17, bringing each of the sample containers in its separate compartments successively in turn into alignment beneath the quill of the diluter probe unit 19 which is lowered in turn into the container in each of the compartments of tray 16B and then raised at about the time the aspirator probe is raised to permit the stepping or indexing of both trays 16A and 16D to the next compartment until these trays have been respectively transferred to the rear ends of their new columns. When this transfer is completed, the columns are each advanced one tray, and new trays 16A and 16D are thus in position for the aspiration and diluter indexing steps. If desired, as described below, the aspirator probe may be actuated to operate only upon alternate indexing steps, being lowered only into the containers in alternate compartments of its tray 16A, thus sampling only the fluids in half of the containers therein.

Aspirating probe 18

Figure 4:
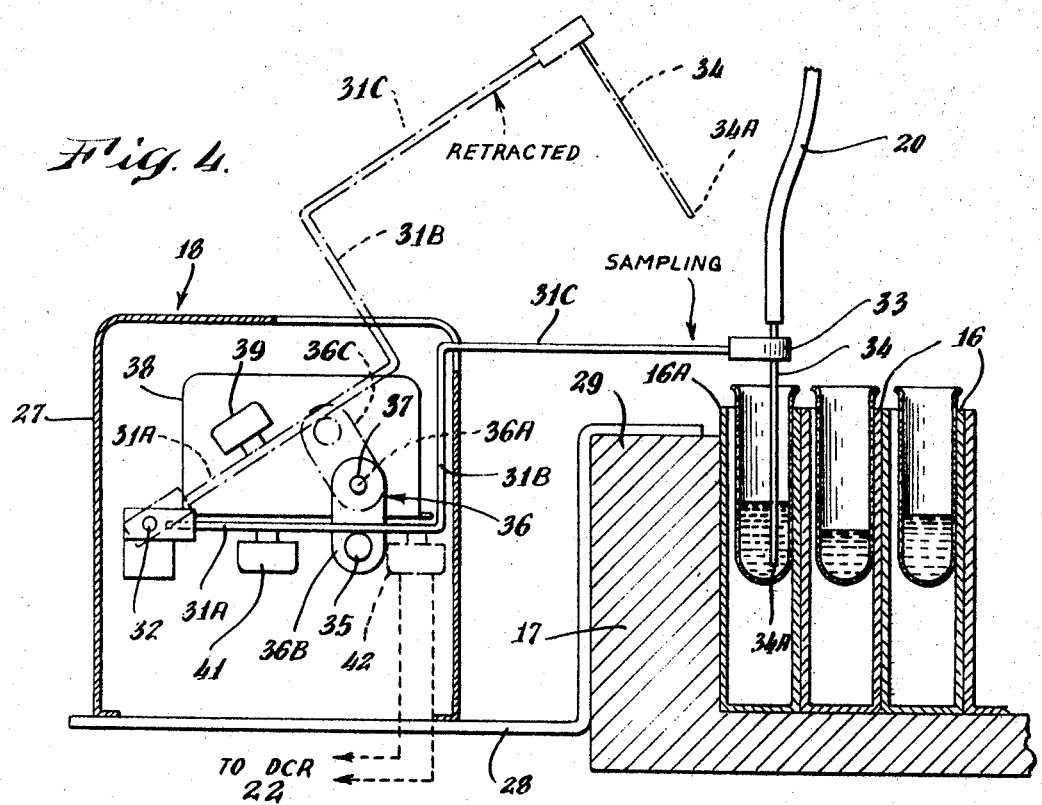
FIGURE 4 is a further enlarged fragmentary schematic view partially in section showing the aspirator probe assembly illustrated in the previous figures.

The sample dipper or aspirator probe unit 18 is shown installed in its operating position at the left-hand treatment station of sample table 17 directly in front of the burner 12 in FIGURES 1 and 3, and the internal mechnism and operation of the aspirator probe unit 18 is shown in FIGURE 4, which is an enlarged sectional front elevation view of the aspirator unit 18 shown in the other figures.

The aspirator unit 18 is contained in a probe housing 27 mounted on a probe bracket 28 anchored to the left-hand rim 29 of the sample table 17. A reversely bent probe arm 31 which may be formed of heavy wire is provided with a rear arm 31A pivotally anchored inside the housing 27 near the side thereof which is spaced away from rim 29 of table 17. As shown in solid lines in FIGURE 4 in its lowermost aspirating position, the probe arm 31 is seen to have three segments, a generally horizontal rear arm 31A extending from the pivot anchor point 32 toward the sampling station at tray 16A; rear arm 31A is integrally joined to a substantially vertical mid arm 31B which in turn is integrally joined to a forearm 31C, at the end of which a clamp 33 anchors a probe quill 34, which is a substantially vertical length of stiff, hollow tubing of stainless steel having flexible tubing 20 secured to its upper end. The lower end 34A of quill 34 will be seen to extend downward into a sample container resting in sample tray 16A to an end position substantially coinciding with an imaginary radial line extending from anchor pivot point 32 along rear arm 31A. Pivoting actuation of the probe arm 31 about its anchor pivot point 32 causes the arm 31 carrying the quill 34 to be raised to the retracted dash line position also shown in FIGURE 4, where the lower end of quill 34 will be seen to lie substantially along an extension of the rear arm 31A. This "radial" positioning of the lower end of quill 34 facilitates the "vertical" withdrawal of the quill from each container in tray 16A as the arm 31 moves from its lower sampling position to its upper retracted position, both shown in FIGURE 4. Also, during the descent of arm 31 from the retracted position to the sampling position, the "radial" positioning of the lower end 34A of quill 34 likewise facilitates the insertion of quill 34 through the exposed upper end of the next container in the next compartment of tray 16A to be indexed into sampling position.

The raising and lowering movement of the probe arm 31 between its two positions is produced by the rotation of a crank pin 35 underlying rear arm 31A, and protruding laterally from a crank arm 36 pivotally mounted for power driven rotation about a crank shaft 37 having an axis 36A. The arm 36 is shown in a lowermost sampling position 36B in solid lines in FIGURE 4, and is shown in an upper retracted position 36C in dash lines in FIGURE 4. The crank arm 36 is mounted on the driven shaft 37 of a sample probe motor 38 whose operation is initiated by switch SW7 in the timing controller unit 26, as shown in FIGURES 5 and 6. A top limit switch 39 anchored inside the probe housing 27 is positioned and connected to be opened by the arrival of probe arm 31 at its uppermost or retracted position, shown in dash lines in FIGURE 4, disconnecting probe motor 38 from the power line to retain probe arm 31 resting on crank pin 35 in its uppermost retracted position, where crank arm 36 holds top limit switch 39 open.

After indexing stepping of tray 16A by the sample table 17, open top limit switch 39 is by-passed by the reverse closing actuation of switch SW7 (B–1), thus connecting line power to probe motor 38 through the opposite, closed bottom limit switch 41, which is shown in FIGURE 4 and also in the circuit diagram of FIGURE 6. Continuing clockwise rotation of crank arm 36 as shown in FIGURE 4 produces clockwise movement of the crank pin 35 on which probe arm 31 rests, lowering probe arm 31 toward tray 16A until the end 34A of sampling quill 34 enters and descends to the bottom of the vial in the compartment of tray 16A now presented for sampling.

As the lower end 34A of quill 34 approaches the lower end of this sample vial, rear arm 31A is approaching a substantially horizontal position, and when the desired terminal position of quill 34 is reached, rear arm 31A actuates the bottom limit switch 41, again disconnecting motor 38 and halting the rotation of crank arm 36 with rear arm 31A resting either on the bottom limit switch 41 or on pin 35 of crank arm 36.

In FIGURE 4, for simplicity, limit switches 39 and 41 are shown positioned to be actuated by probe arm 31; in practice, crank arm 36 may be used to actuate limit switches 39 and 41, permitting probe arm 31 to be raised to an elevated position for calibration sampling or other purposes.

An additional lower limit switch 42, or additional contacts in switch 41, may be provided, as shown in dash lines in FIGURE 4, to close a circuit and thus indicate the arrival of probe arm 31 in the lowermost sampling position just described; and the position signal produced by this arrival of probe arm 31 may be supplied to the

Diluter and diluter probe

As shown in FIGURES 1 and 3, the diluter probe unit 19 positioned at the right-hand side of sample table 17 is generally similar to the aspirator probe unit 18 at the left-hand side of table 17. Referring specifically to the cooperating structural features of aspirator probe unit 18 shown in FIGURE 4, the diluter probe 19 is provided with a substantially similar cooperating quill 43, arm 44 and related structural features, producing the descent of its probe quill 43 into the sample vial then presented in the currently indexed compartment of the tray 16D, and then producing the retraction of its diluter probe quill 43 on command. The lowering and retraction of the diluter probe 43 thus follow the same operating cycle described above for the aspirator probe and probe quill 34 and its arm 31, positioned by a crank pin on a crank arm similar to arm 36 with similar limit switches 39A and 41A, and a similar drive motor 38A.

The diluter 21 is connected by suitable flexible tubing to the diluter probe unit 19, and serves to dilute the fluid samples to be tested with predetermined amounts of any selected diluent in order to provide the desired sample fluid viscosity, or to provide samples adequate for measuring the concentrations of numerous trace elements in repeated measuring operations, or to bring the actual concentrations of the element being measured within the optimum measuring range of the instrumentation. For example, in measurements of sodium and potassium concentrations in blood serum, the serum is preferably diluted with distilled water by a ratio of 50:1; for calcium and magnesium, the blood serum is diluted by a ratio of 10:1 in distilled water containing 0.25% lanthanum; for determining the concentration of copper and zinc in blood serum, the serum is preferably diluted 1:1 in water. The high precision of these measuring systems is reflected by their measurement of the concentrations of magnesium in blood serum. With dilutions of 50:1 and 100:1 in distilled water, measurements of the concentration of magnesium in the range from 17.0 to 20.0 parts per million were made with a relative standard deviation ranging only between 2 and 3%. Comparable small deviations are observed in the measurement of the concentration of calcium and potassium in blood serum.

In the measurement of trace metals present in used lubricating oils, reflecting the wearing away of metal parts in bearings or cylinder walls of internal combustion engines for example, high precision measurements within 5% deviation have been made for the concentrations of iron, copper, silver, magnesium, nickel, tin, aluminum, chromium and lead. In these lubricating oil measurements, the oil is preferably diluted by a ratio of 9:1 with an organic solvent such as methyl isobutyl ketone, and in this dilution, trace concentrations of these various metals ranging between 0.1 and 40.0 parts per million in many hundreds of samples have been accurately measured and recorded using the systems of this invention.

The automatic diluter 21 is designed to be compatible with a variety of diluents including such organic solvents, and it may also be used with corrosive samples, since corrosion-resistant glass or ceramic materials or inert plastics are preferably employed in fabricating the diluent reservoir, and the conduits and capillary tubes such as the diluter probe quill 43. While the actual mechanism and structural features of the diluter 21 do not form a part of the present invention, it should be noted that the diluter preferably incorporates two metering pumps, one having a capacity of one milliliter of the sample fluid, and the other having a capacity of ten milliliters of diluent. By adjusting independent selector dials, the operator may reduce the volume drawn up by each pump by a factor of ten, thus providing dilution ratios ranging between 1:1 and 99:1.

In the lower position of the diluter probe quill 43 shown in solid lines in FIGURE 3, the diluter 21 connects a zone of reduced pressure to the interior of the quill 43 via a length of flexible tubing 46. The diluter 21 functions by drawing the predetermined amount of fluid from the container in tray 16D into the lower open end of its quill 43.

A predetermined amount of the fluid sample from the presented vial is drawn into the lower end of the diluter probe quill 43 by operation of a metering pump in the diluter 21, filling the lower end of the diluter quill 43. The remainder of quill 43 and flexible tubing 46 is entirely filled with the diluent. The preferred mode of "dilution" operation for the diluter probe unit 19 and the diluter 21 employs sample solutions filled in vials or test tubes inserted only in alternate (even-numbered or odd-numbered) compartments in each of the trays of the sample table 17, with empty vials or test tubes being placed in all remaining compartments, between the sample containers. Thus, as tray 16D is indexed past the dilution station before diluter probe unit 19, the diluter probe quill 43 descends first into a sample solution, withdrawing the predetermined volume of the sample, and is then retracted. When the next compartment of tray 16D is indexed into position before the quill 43, it contains an empty vial. Quill 43 then descends into the empty vial, ejecting the predetermined amount of the sample fluid, and then further ejecting a second predetermined amount of the diluent with considerable force at relatively high pressure and velocity, assuring thorough mixing of the sample and the diluent while simultaneously flushing the interior of the diluter probe quill 43 thoroughly with pure diluent. Thus, in this "dilution" mode of operation, raw samples are filled in every alternate "sample" vial, and diluted samples are then dispensed by the diluter probe unit 19 cooperating with diluter 21 into the intervening empty vials. Accordingly, the aspirator probe 18 is programmed to descend and withdraw a portion of the diluted samples only in alternate compartments of the tray when it reaches the forward end of the advancing rear column 16C and becomes tray 16A. In a preferred embodiment of the invention, the sample table accommodates a total of 200 test tubes ranged in 20 trays of 10 each, and accordingly, when automatic dilution is not required, 200 raw samples can be tested by these systems; when automatic dilution is employed, 100 raw samples can be accommodated, diluted with diluent by the predetermined ratio, and measured for concentrations of the desired trace element by the automatic systems of this invention.

Data conversion and recording devices

The atomic absorption spectrophotometer employed in the systems of this invention delivers its output signal as a function of the percentage of absorption of the radiation wavelength of interest, and Beer's law states that the sample concentration of the trace element being measured is proportional to the logarithm of this figure. The preferred readout device 22 employed in these systems is the Perkin-Elmer Model "DCR" digital concentration readout accessory, which automatically takes the logarithm of the indicated percent absorption and multiplies it by a variable scale factor, determined by calibration of the system using samples with known concentrations of the trace element being measured. This allows the test result to be read out directly as "concentration" in any desired units on four illuminated digit indicators. To increase precision and improve detectability when necessary, this readout device can be adjusted to provide data averaging or integration times up to 50 seconds, and the timing controller 26 is automatically provided with "hold" or delay program features, interrupting the continuous automatic operation cycle of the system until the desired integration has been completed to permit an extended radiation absorption observation period. Furthermore, this readout device 22 may take four, eight or sixteen readings of the same sample and automatically present their average.

The digital output signal is automatically supplied by the readout device 22 to a data recorder 23. In the preferred embodiments of the systems of this invention, the recorder 23 is a Perkin-Elmer paper tape printer-sequencer, Model "PRS," in which four separate information channels are used to imprint on paper tape the digital concentration reading received from the DCR readout device 22 upon command. If desired, four additional channels of information may provide a series of sample identification numbers ranging from 0001 to 9999, and these are governed by an electro-mechanical counter sequencer incorporated in the recorder 23, which may be set in an automatic mode for sequentially increasing these sample identification numbers.

In many cases the analog output signal from the testing unit 11 may be employed directly, without conversion to a digital signal. In such cases an analog readout device such as a pen recorder or a dial indicator may be sufficient, for example, and the timing controller 26 is then connected to actuate the readout device for the predetermined readout period required for an accurate data indication, after which the next sampling cycle is initiated.

Timing controller systems

The timing controller systems of the present invention incorporated in the controller unit 26 are designed and connected to produce the initiation of the various co-operating functions of the other units of these systems in the manner described above. In the preferred embodiment, timing controller 26 incorporates the circuitry illustrated in FIGURE 6 which is designed to provide the programmed on-off switching conditions shown diagrammatically in FIGURE 5 for either the dilution mode of operation, or similar programmed conditions for the non-dilution mode, in which the diluter probe unit 19 and diluter 21 are inactivated.

As shown in FIGURE 6, the switching circuitry of timing controller 26 includes two separate timer motors B–1 and B–2 respectively driving a series of timer cams whose followers are constructed to operate a plurality of switches, SW1 through SW8. Timer motor B–1 turns in the "dilution" mode; timer motor B–2 turns in the "non-dilution" mode.

The switching "dilution" mode sequence diagram of FIGURE 5 shows schematically in parallel time sequences the closed or open conditions of the switches SW1 through SW8 which are shown arrayed above timer motor B–1 in a column at the left-hand side of FIGURE 6. A similar series of six switches is shown arrayed in the second column above the second timer motor B–2 in FIGURE 6, and this second column of switches actuated by timer motor B–2 is employed in the "dilution-off" condition of the system, while the first column of switches actuated by the timer motor B–1 is employed in the "dilution" mode of the system.

A third column of switches serially arrayed above a pair of relays K–1 and K–2 is also shown in FIGURE 6, providing a choice between the two operating modes, "dilution-on" and "dilution-off." When the relays K–1 and K–2 are de-energized, the switch armatures of the switches of this third column are in their uppermost position, and the system is in the "dilution-off" condition or "non-dilution" mode; when relays K–1 and K–2 are energized by the closing of the ganged "dilution-on" switches 47 and 48, operated by single manual toggle, the relay switch contact armatures are all drawn to their lower positions by the energized windings of relays K–1 and K–2, placing the system in its "dilution" mode.

The AC power line connections are shown arrayed across the lower end of FIGURE 6 including a "power on" switch 50 and indicator lamp 49: the ganged "dilution-on" switches 47 and 48 governing a "dilution on" indicator lamp 51; a manual "sampling" or "start" switch 52; and a "sampling" indicator lamp 53, all being connected across the main power line. Switching of the manual "dilution" switch 47–48 to its "off" position disconnects the "dilution on" indicator lamp 51 and instead connects a "dilution off" indicator lamp 54 across the power line. A line socket 55 is also connected across the power line to power the diluter 21 if desired; in an emergency, the opening of switch 50 thus stops diluter 21 and the timer motors simultaneously.

The switch connections and their cooperation with the various subassembly units of the systems of this invention will now be described with reference to the timing cycle diagram of FIGURE 5, showing the open or closed condition of the various switches at all stages of an operating cycle of this system in its "dilution" mode.

Initiating operation of the systems

The measuring and recording systems of the present invention are ready for the initiation of operation upon connection of the line plug of the timer controller 26 to the power line at the lower left-hand corner of FIGURE 6, and the similar line connection of line plugs on the indexing table 17, the diluter 21, the readout units 22, the data recorder 23, and the measuring instrument 11. The sample probe-actuating motor 38 in the sample probe unit 18, and the similar motor 38A in diluter probe unit 19 both receive their power through the timer controller circuit of unit 26, as shown in the circuit diagram of FIGURE 6.

Cycle-completion operation

Whether the unit is in the "dilution-on" mode or in the "dilution-off" mode, operation is initiated by manual actuation of the on-off "sampling" lamp switch 52 to its "on" position, simultaneously closing a second ganged "start" switch 56 to complete the circuit from timer motor B–1 or timer motor B–2 through switch 56 and the switch SW3 directly to the power line. The ganged "sampling" switches 52 and 56 are on-off selector switches which remain in their "on" position until manually turned "off," and the same is true of the ganged "dilution" on-off switches 47 and 48.

With reference to the 0° to 360° scale spanning the top of the timing diagram of FIGURE 5, the normal starting position for both timer motors B–1 and B–2 is at a position in the timing cycle just past 0°. At this point in the operating cycle, as indicated in FIGURE 5, the end of cycle switches SW1 are in their "H" or "Hold" condition, disconnecting the two timer motors B–1 and B–2 from the power line.

If the "sampling" switches 52 and 56 are moved to their "off" position during the operation of a cycle, the arrangement of the switches SW1, switch 56 and holding relay K–3 in combination with the sequence selection biasing or mode relays K–1 and K–2 assure completion of the operating cycle before either timer motor B–1 or B–2 is disconnected from the line. The same is true if the "dilution on-off" selector switches 47–48 are manually actuated to change the dilution mode from "dilution-on" to "dilution-off" in the midst of an operating cycle. Thus, for example, if timer motor B–1 is operating in the "dilution-on" mode, with switches 52 and 56 closed for sampling and switches 47 and 48 in their uppermost "dilution-on" condition, the timer motor B–1 will continue to operate throughout its operating cycle shown in FIGURE 5 until it reaches the 360° or 0° position in its cycle, at which point switch SW1 (B–1) moves from its "R" or "Running" condition to its "H" or "Hold" condition, disconnecting timer motor B–1 from line voltage.

From 10° to 360°, the timing cam on the shaft of timer motor B–1 maintains switch SW1 (B–1) in its "R" or "Running" condition directly connecting the line voltage across the winding of the timer motor B–1; switch SW1 (B–1) in parallel with on-off switch 56 thus bypasses the on-off switch 56 until the timer motor B–1 reaches its 0° position.

In a similar manner, so long as switch SW1 (B–1) is in its "R" condition the actuation of "dilution" switches 47 and 48 from their "on" to their "off" positions fails to de-energize mode relays K–1 and K–2, which are also directly connected across the power line through the contacts of the de-energized holding relay K–3 and the dormant switch SW1 (B–2), which remains in the "H" or "Hold" condition it assumed at the end of its last previous operating cycle.

The same cycle-completion sequence of operations occurs if timer motor B–2 is operating in the "dilution-off" mode of the system, with dilution on-off switches 47 and 48 in their "off" positions. So long as the "Sampling" start switches 52 and 56 are in their uppermost "on" condition, applying power line voltage across timer motor B–2 via switch 56 and contacts 4 and 12 of relay K–2, timer motor B–2 begins its operating cycle and its switch SW1 then moves downward to its "R" position at about the 10° point in the cycle, thus by-passing the on-off switch 56 and the dilution off contacts 4 and 12 of relay K–2, to maintain timer motor B–2 across the power line voltage until the next end-of-cycle actuation of switch SW1 (B–2) to its "H" condition.

Meanwhile, switch SW1 (B–1) is in its uppermost, "H" position. This dormant switch SW1 (B–1) continuously connects the line voltage directly across the holding relay K–3, maintaining its contacts picked up and maintaining the mode relays K–1 and K–2 disconnected from the line. If the "dilution" switches 47–48 should be shifted to their "on" condition in the midst of a cycle of the "no dilution" timer motor B–2, this circuit would thus maintain the mode relays K–1 and K–2 disconnected. Switch 48, even if closed by manual actuation, receives its line voltage through SW1 (B–2) only when the latter is at "H," and this cannot occur until the timer motor B–2 reaches the end of its operating cycle, as shown in FIGURE 5.

Sequential events in an operating cycle

Comparison of the timing cycle diagram of FIGURE 5 with the circuit diagram of FIGURE 6 shows the sequence of events resulting from the successive actuation of the various switches by cams on the shafts of the timer motor B–1 or B–2. FIGURE 5 is specifically directed to the operation of the timer motor B–1 in the "dilution-on" mode, and the timer switches SW1 through SW8 are those turned by timer motor B–1 unless designated "(B–2)" in the following description.

If the manual "sampling" start switch 52 and 56 remains in its upper or "on" condition, this by-passes and short circuits the "H" condition of switch SW1 as the timer motor B–1 reaches the end of its cycle, and line voltage is continuously supplied through switch 56 direct to the winding of timer motor B–1, which thus continues its rotation without interruption.

After about 6° of the operating cycle, the switches SW7 and SW8 are both moved from their "R" or "Raise" positions to their "L" or "Lower" positions, respectively short circuiting the top limit switches 39 and 39A shown at the right hand side of FIGURE 6. Top limit switch 39 is also shown in FIGURE 4.

This "Lower" condition of switches SW7 and SW8 therefore connects the line voltage through the closed bottom limit switches 41 and 41A directly across the windings of the motors 38 and 38A, thus by-passing the open top limit switches 39 and 39A. This line voltage initiates rotation of these motors, rotating their crank arms away from their uppermost stop positions, and producing descending movement of both the probe quills 34 and 43 into their respective indexed containers.

At about 26° of the operating cycle, switch SW5 closes, initiating the charging operation of the diluter pump, drawing a first predetermined volume of the sample into the open end 43 of the diluent-filled capillary probe 43. The diluter will automatically stop after completing its charging operation.

At about 32° of the operating cycle, the DCR switch SW4 has closed to reset the digital concentration readout unit 22 to zero, and by that time the aspirator probe quill 34 has reached its lowermost position and actuated its lower limit switch 41. The compressed air being delivered to the burner 12 serves as a continuous aspirator, drawing through aspirating probe quill 34 a small stream of the sample being tested, and ejecting this stream atomized directly into the flame of burner 12 for atomic absorption measurement by the measuring unit 11. Accordingly, at about 58° of the operating cycle, switch SW4 moves from its closed to its open position, initiating the digital concentration readout unit 22, which converts the analog data produced by the measuring unit 11 into a digital output signal which is fed to the data recorder 23.

At about 38° of the operating cycle, switch SW2 opens and remains open until it closes again at the 48° point, thus briefly de-energizing the relay K–4 to assure that its contacts have dropped open and are thus reset for subsequent operation. At about 64°, switch SW3 moves from its "R" to its "H" condition, interrupting the connection from the power line to timer motor B–1 and stopping the cycle at this point. The purpose of switch SW3 is to interrupt the progress of the entire operating cycle until readout unit 22 has performed the necessary number of integrations or averaging operations and delivered a useful digital readout signal to the data recorder 23, and furthermore until the recorder 23 has completed its recording operation, at which time the data recorder 23 delivers a pulse called a "printing pulse" to relay K–4, again closing its contacts 5 and 8, and 6 and 7, and thus reconnecting the line voltage through switch SW1 to timer motor B–1, restarting the operating cycle at about its 64° point, and opening switch SW3 to maintain the line voltage across the winding of timer motor B–1 throughout the remainder of the cycle. The restarting pulse to energize relay K–4 may be supplied by the readout unit 22, or by a timing or time delay device if direct analog readout or recording is employed. Any such restarting pulse can actuate a predetermining counter 60 having a switch connected in series with the "sampling" start switch 56, to stop the cycling operation when the predetermined number of samples has been tested. At about 103°, both switches SW7 and SW8 move to their "R" or "Raise" positions, by-passing the open bottom limit switches 41 and 41A by short circuiting them to supply line voltage to the windings of the sample probe motor 38 and diluter probe motor 38A through the closed top limit switches 39 and 39A respectively, and thus initiating continued rotation of the crank arms to raise the two probe quills 34 and 43 toward their retracted positions as shown in FIGURES 3 and 4.

At about 123° of the cycle, the indexing sample table switch SW6 closes to initiate the next indexing movement of the table to the next container compartment position.

The latter half of the operating cycle from 150° to 360° is primarily concerned with the operation of the diluter units 10 and 21. Following the table indexing movement, switch SW8 operates at about 161° initiating the descent of the diluter probe quill 43 in the manner already described, by by-passing the open top limit switch 39A. Diluter pump switch SW5 closes at about 181° initiating the pump discharge operation, to dispense all of the sample previously drawn in and also an additional predetermined volume of the diluent stored in the diluter probe quill and associated conduits above the predetermined indrawn sample volume just dispensed. The diluter 21 concludes this discharge operation in due course at the desired dilution ratio, and at about 328° the sample table switch SW6 is closed to initiate the table indexing operation. If the manual sampling start switch 56 has been turned to its "off" position during the foregoing cycle, the opening of switch SW1 to its "Hold" position as timer motor B–1 reaches the zero position at the end of its cycle now disconnects timer motor B–1 from the line voltage. If the sampling switch 56 remains "on," the timer motor B-1 continues its rotation and continuous cycling operations of this automatic measurement recording apparatus proceeds.

If the dilution selector switch 47, 48 has been turned from its "on" to its "off" position during the operating cycle just described, the opening of switch SW1 to its "Hold" position upon the arrival of timer motor B-1 at the zero position in its operating cycle now energizes holding relay K-3, breaking the connection to line voltage previously supplied to relays K-1 and K-2 through the switch SW1 of timer B-2 stopped between the 0° and 10° points in its own operating cycle, and thus de-energizing relays K-1 and K-2, placing all of their contacts in their uppermost or "dilution-off" positions.

It will be seen that the switch cams rotated by the "no-dilution" timer B-2 do not affect the diluter 21 or its probe unit 19, since switches SW5 and SW8 are omitted from the B-2 array. If no dilution function is desired, suitable timing cam configurations can be used to aspirate sample fluid from each compartment after each indexing movement of sample table 17.

It should be noted that mechanical, thermal or solid state time delay switches providing predetermined timing delays in switch operation may be employed in place of the timer motors and cam-actuated switches shown in FIGURES 5 and 6 to provide the desired sequential actuation of the various units in the systems of this invention.

In addition, self-sequencing operations like those produced by the lower limit switch 42 and the restart relay K-4 may be employed at other points in the systems of this invention to trigger successive events in response to completion of preceding events.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

What is claimed is:

1. Fluid sample analyzing apparatus comprising:
   a fluid sample testing device incorporating means for measuring a predetermined characteristic of a fluid sample and producing an output signal which is a function of the value of the measured characteristic;
   a fluid sample handling table provided with means for storing a large plurality of individual fluid samples, and incorporating indexing means for moving these fluid samples successively to a first testing station;
   sample delivery means for drawing sample fluid from successive fluid samples while it is presented at said first testing station, and delivering the same to the fluid testing device;
   an automatic controller device operatively connected to the sample handling table and to the sample delivering means for actuating in predetermined sequence the successive indexing moves of individual samples by the sample handling table to said testing station, and the successive withdrawals of sample fluid from each fluid sample presented at said testing station for delivery to the testing device;
   said controller device comprising a switch means for interrupting operation of said controller device while each sample is being measured by said sample testing device; and
   operating cycle restart means, actuated by said sample testing device when a predetermined period of output signal has been obtained, for effectively bypassing said interrupting switch means, so as to resume operation of the entire analyzing apparatus after the desired data collection, has been completed.

2. The apparatus defined in claim 1, in which:
   said fluid sample testing device is of the type producing an output signal in analog form;
   and an analog-to-digital converter is connected to receive said analog output signal from said testing device and to convert it to a digital output signal.

3. The apparatus defined in claim 2, in which:
   a data recorder is operatively connected to the output of said converter to record said digital output signal on a permanent record;
   and said data recorder further comprises means for recording sample identifying indicia in correlated relationship to each measured and recorded digital output signal.

4. The apparatus defined in claim 1, in which:
   a fluid sample test readout switch is operatively positioned so as to be actuated by said sample delivery means reaching its operative sample drawing position;
   said sample readout switch being operatively connected so as to cause initiation of the measurement of said predetermined characteristic of a fluid sample, when said readout switch is actuated.

5. The apparatus defined in claim 1, in which:
   said sample delivery means comprises a movable probe and means for moving said probe between a lowered sampling position and a raised retracted position;
   an upper limit switch physically actuated by said sample delivery means upon said raising of said probe to its retracted position;
   a lower limit switch physically actuated by said sample delivery means upon lowering of said probe to its sampling position;
   said controller device comprising switch means connected in series with said upper limit switch and said lower limit switch, for causing movement of said probe toward its two respective positions;
   whereby said upper and lower limit switch positively determine both the direction of probe movement and the final probe position in both its raised and lowered positions.

6. The apparatus defined in claim 1, in which:
   said fluid sample handling table comprises a large plurality of sample containers, alternate containers being provided with fluid samples, interposed between empty "diluted sample" containers;
   sample diluting means is provided at a second dilution station for drawing sample fluid from each alternate sample container containing fluid sample as each sample container is successively indexed by said sample handling table;
   said sample diluting means dispensing each said fluid sample together with a predetermined volume of diluent into the next adjacent empty "diluted sample" container subsequently presented at said second dilution station;
   said controller device being of such construction and being so connected to said sample delivery means as to cause said delivery means to draw mixed sample and diluent only from the alternate "diluted sample" containers, when said sample diluting means is operating;
   whereby only diluted samples are delivered to said testing device.

7. The apparatus defined in claim 6, in which:
   said controller device comprises a first series of timing switches operatively connected to actuate said sample handling table, said sample delivery means, and said sample diluting means in a first "dilution" mode of operation;
   said controller device further comprises a second series of timing switches operatively connected to actuate said sample handling table and said sample delivery means in a second "non-dilution" mode of operation;
   and a manually operable switch means for optionally causing said first series of timing switches or said second series of timing switches to be sequentially operated;
   whereby the operator may choose between a "dilution"

or a "non-dilution" mode of operation of the fluid sample apparatus.

8. The apparatus defined in claim 7, in which:
said manually operable switch is of such construction and is so connected to said controller device that operation of said manual switch while said controller device is in operation will cause change-over from operation of one of said series of timing switches to the other only upon completion of a cycle of operation of said controller device.

9. The apparatus defined in claim 1, in which:
a manually operable "sampling" switch is operatively connected to said controller device so as to normally cause said controller device to repeat continuously an additional operating cycle upon completion of each previous operating cycle.

10. The apparatus defined in claim 9, in which:
said manually operable "sampling" switch is of such construction and is so connected to said controller device that opening of said switch during a cycle of operation does not stop said controller device until that cycle has been completed.

11. The apparatus defined in claim 9, in which:
a predetermining counter is operatively connected to said controller device in series with said manually operable "sampling" switch so as to halt the continuous cycling operation after a selectable predetermined number of cycles, even though said manual "sampling" switch is still in its closed position.

References Cited

UNITED STATES PATENTS

| | | | |
|---|---|---|---|
| 3,142,719 | 7/1964 | Farr | 73—423 XR |
| 3,178,266 | 4/1965 | Anthon | 23—253 |
| 3,192,968 | 7/1965 | Baruch et al. | 73—423 XR |
| 3,239,312 | 3/1966 | Bell et al. | 23—253 |
| 3,251,229 | 5/1966 | Isreeli et al. | 73—423 |
| 3,327,535 | 6/1967 | Sequeira | 73—423 |

LOUIS R. PRINCE, Primary Examiner

H. C. POST III, Assistant Examiner

U.S. Cl. X.R.

73—423; 23—253; 307—38